United States Patent
Muthali et al.

(10) Patent No.: US 10,530,421 B2
(45) Date of Patent: Jan. 7, 2020

(54) LOW POWER ULTRA-WIDE-BAND TRANSMITTER

(71) Applicant: Maxim Integrated Products, Inc., San Jose, CA (US)

(72) Inventors: Harish S. Muthali, San Jose, CA (US); Kourosh Pahlavan, Cupertino, CA (US); Elik E. Cohen, Fremont, CA (US); Charles John Razell, Pleasanton, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 40 days.

(21) Appl. No.: 15/575,737

(22) PCT Filed: May 20, 2016

(86) PCT No.: PCT/US2016/033602
§ 371 (c)(1),
(2) Date: Nov. 20, 2017

(87) PCT Pub. No.: WO2016/196045
PCT Pub. Date: Dec. 8, 2016

(65) Prior Publication Data
US 2018/0123639 A1    May 3, 2018

Related U.S. Application Data

(60) Provisional application No. 62/168,004, filed on May 29, 2015.

(51) Int. Cl.
*H04B 1/71*    (2011.01)
*H04B 1/7163*    (2011.01)

(52) U.S. Cl.
CPC .............. *H04B 1/71635* (2013.01)

(58) Field of Classification Search
CPC .............. H04B 1/71635; G06K 7/10
(Continued)

(56) References Cited

U.S. PATENT DOCUMENTS

2005/0058152 A1    3/2005  Oksanen et al.
2010/0141233 A1    6/2010  Kwok
(Continued)

OTHER PUBLICATIONS

International Search Report dated Sep. 1, 2016, in International PCT Patent Application No. PCT/US16/033602, filed May 20, 2016 (4pgs).

(Continued)

*Primary Examiner* — Michael R Neff
(74) *Attorney, Agent, or Firm* — North Weber & Baugh LLP

(57) ABSTRACT

Systems, devices and methods are disclosed for an ultra-wide-band (UWB) transmitter tag capable of operating in different power mode depending on voltage level and/or host interruption signal. The transmitter tag comprises a power management circuit, a one-time-programmable memory (OTP), a read/write memory, a state machine for controlling/monitoring the operation of the tag. The tag goes into the high power mode when the power supply ramps up to a preset voltage level. During the high power mode, the tag consumes the higher level of electrical current as indicated by the battery current signal. Upon completion of high power consumption activity, such as OTP memory download, the tag exits the high power mode and enters the low power mode. The power supply current goes to the low level to minimize the power consumption by the tag.

8 Claims, 9 Drawing Sheets

(58) Field of Classification Search
USPC .......................................................... 375/130
See application file for complete search history.

(56) References Cited

U.S. PATENT DOCUMENTS

| | | |
|---|---|---|
| 2010/0277283 A1 | 11/2010 | Burkart et al. |
| 2013/0093466 A1 | 4/2013 | Lee et al. |
| 2013/0265093 A1 | 10/2013 | Zhang et al. |
| 2014/0211573 A1 | 7/2014 | Chen et al. |

OTHER PUBLICATIONS

Written Opinion dated Sep. 1, 2016, in International PCT Patent Application No. PCT/US16/033602, filed May 20, 2016 (8pgs).

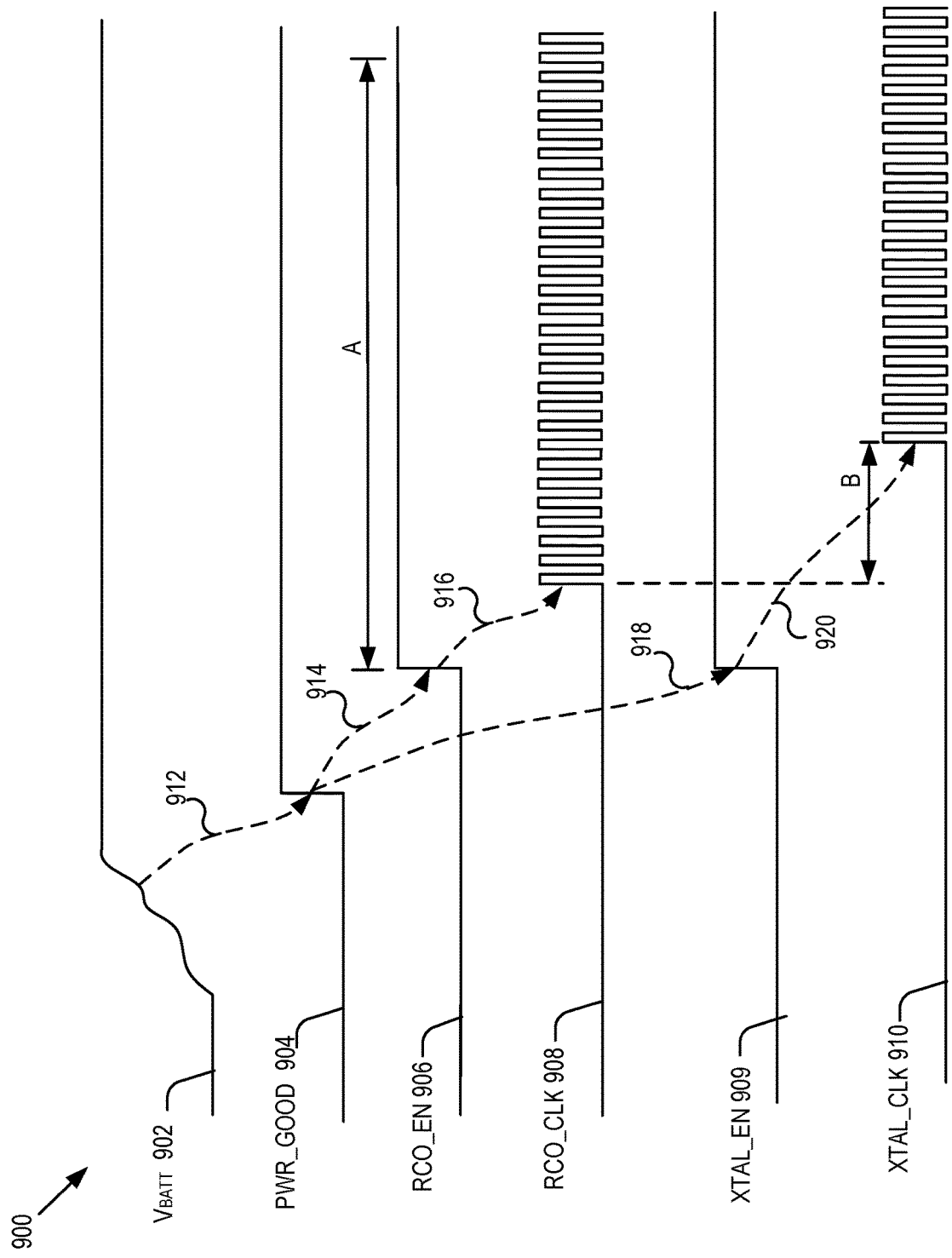

LOW POWER ULTRA-WIDE-BAND TRANSMITTER

CROSS-REFERENCE OF RELATED APPLICATIONS

This is a US National Phase Patent Application Under 371, claiming priority to International PCT Patent Application PCT/US2016/033602, entitled "Low Power Ultra-Wide-Band Transmitter", and filed May 20, 2016, which claims priority to U.S. Provisional Patent Application No. 62/168,004, entitled "Low Power Ultra-Wide-Band Transmitter", and filed May 29, 2015, which applications are hereby incorporated herein by reference in their entireties.

BACKGROUND

A. Technical Field

The present invention relates to signal transmitters, and more particularly, to ultra-wide-band (UWB) transmitters.

B. Background of the Invention

UWB is a radio technology that is used at a very low energy level for short-range, high-bandwidth communications using a large portion of the radio spectrum. UWB communications offers many advantages. For instance, UWB signals are more difficult to detect than narrowband (essentially single frequency) signals and thus, the combination of broad spectrum, low power, and extremely short pulses also cause much less interference with other devices than do conventional narrowband wireless systems. Also, UWB is much more resistant to electrical interference from other devices than other wireless technology. Thus, UWB's data capacity, speed, low power requirements, and resistance to interference make it attractive as a communications technology.

Typically, a UWB transmitter is powered by a battery and, thus, the capacity of the battery may be one of the factors that affect the lifetime of the UWB transmitter. For a given battery capacity, the lifetime of the UWB transmitter may be affected by the power consumption rate. Also, the user may replace or recharge the battery if a proper warning can be sent to the user when the voltage of the battery goes below a threshold level. As such, there is a strong need for systems that can properly manage the power consumption of the UWB transmitter and/or warning systems that can send warning signals to the user when the voltage level of the battery goes below a preset level.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 9 shows an exemplary internal circuit timing diagram of the UWB transmitter in FIG. 8 according to another embodiment of the present invention.

DETAILED DESCRIPTION OF THE PREFERRED EMBODIMENTS

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components in the figures are not restricted to connections that are effected directly. Instead, connections illustrated in the figures between components may be modified or otherwise changed through the addition thereto of intermediary components, without departing from the teachings of the present invention.

Figure 1:
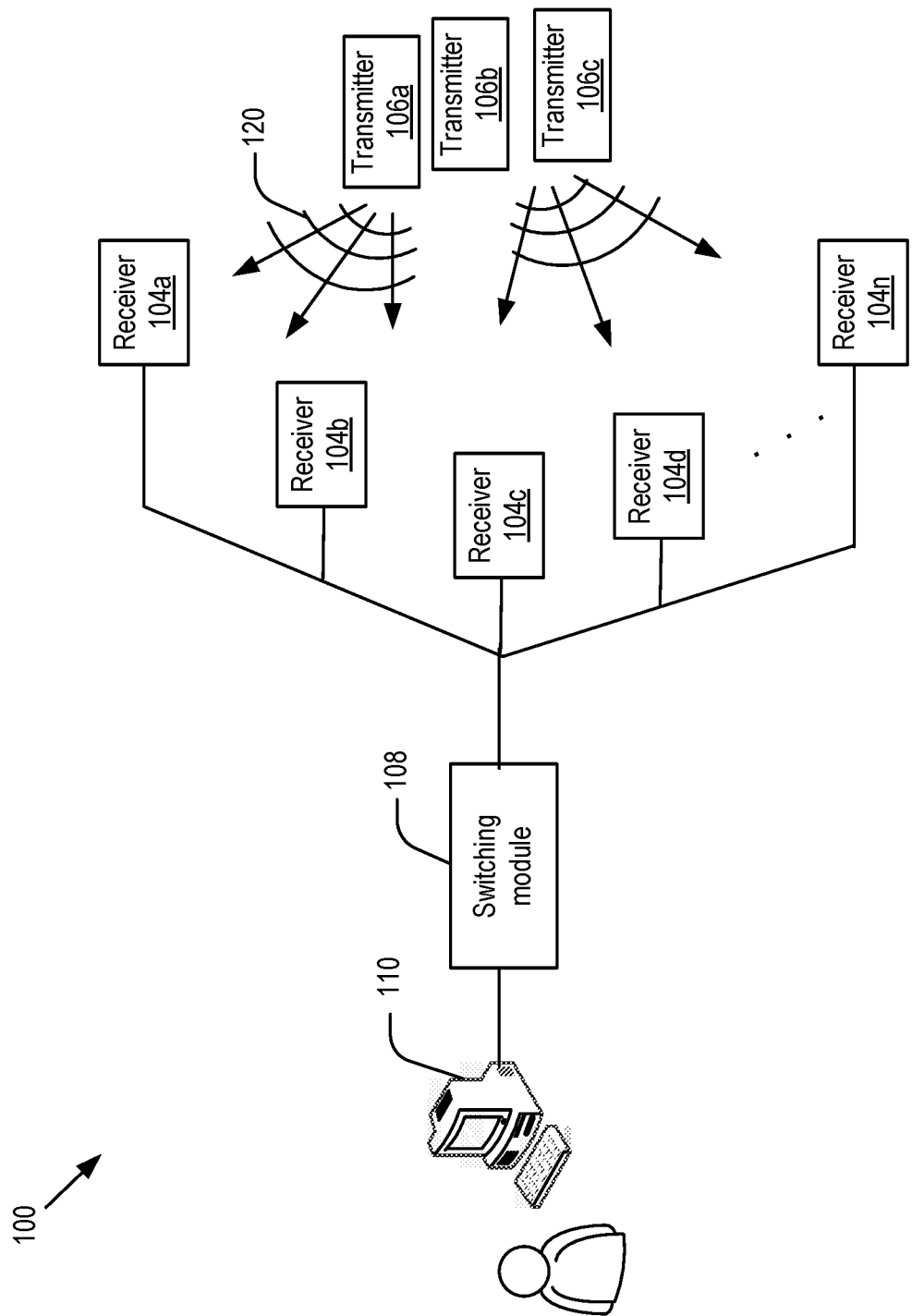
FIG. 1 shows a schematic diagram of an exemplary UWB communication system according to one embodiment of the present invention.

FIG. 1 shows a schematic diagram of an exemplary UWB communication system 100 according to one embodiment of the present invention. As depicted, one or more UWB transmitters 106a-106c may transmit UWB signals/beacons 120 to one or more receivers 104a-104n. The output signals from the receivers 104a-104n may be sent to a switching module 108, such as power-over-Ethernet switch, where the switching module 108 may control the data flow from the receivers 104a-104n to a server 110, such as computer. For instance, the switching module 108 may be coupled to the server 110 via a single cable for transmitting data from and providing electrical power to the receivers 104a-104n.

It should be noted that any suitable number of UWB transmitters may be included in the system 100. Likewise, it should be noted that any suitable number of UWB receivers may be included in the system 100. In embodiments, each of the transmitters 106a-106c may be a tag that is able to transmit UWB signals in a preset frequency band. In embodiments, using the UWB signals received by the receivers 104a-104n and the triangulation technique, the exact locations of the transmitters 106a-106c may be determined.

Figure 2:
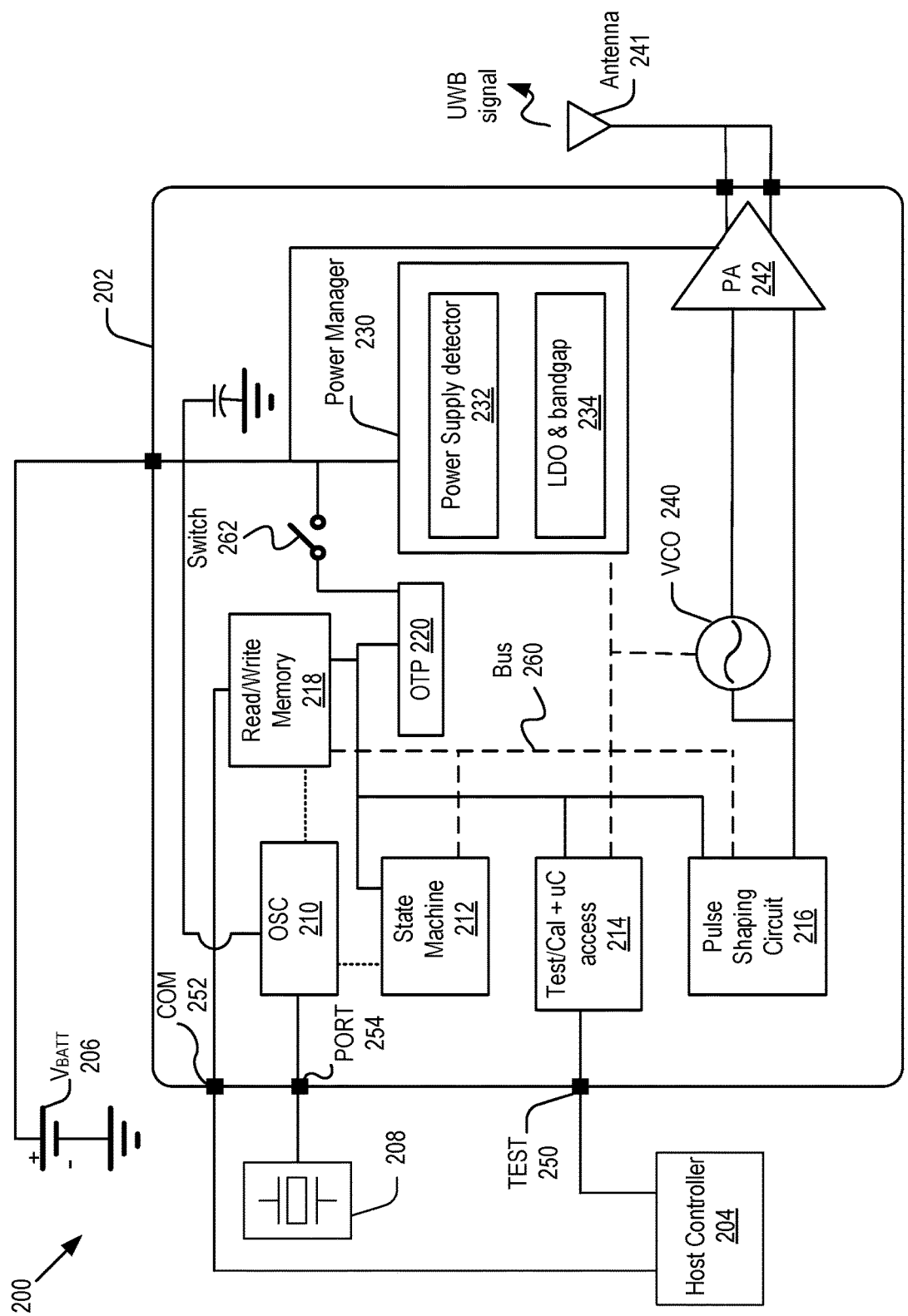
FIG. 2 shows a schematic diagram of a UWB transmitter according to one embodiment of the present invention.

FIG. 2 shows a schematic diagram 200 of a UWB transmitter according to one embodiment of the present invention. As depicted, the UWB transmitter 200 includes: a tag 202; and a power supply 206, such as coin cell battery, for providing electrical power to the tag 202. (It is noted that the tag 202 and the power supply 206 may form an integral body.) In embodiments, the tag 202 may be implemented in an integrated circuit (IC) chip. The UWB transmitter 200 may also include an external crystal 208 that oscillates upon receiving electrical power from the oscillator 210 through the port 254. Since the external crystal 208 and oscillator 210 are operated together to generate a clock signal, XTAL_CLK, the term oscillator may collectively refer to the external crystal 208 and oscillator 210.

The tag 202 may include a power management circuit (or shortly power manager) 230 for managing the power consumption by the tag; an one-time-programmable memory (OTP) 220 for storing information; a read/write memory 218, such as serial-peripheral-interface (SPI) registry for storing information downloaded from OTP 220; a state machine 212 for controlling/monitoring the operation of one or more components of the tag 202; a Test/Calibration & microcontroller access 214 (or shortly TC access) for sending information to an outside host controller 204 via the TEST port 250; a pulse shaping circuit 216 for generating a waveform; a voltage-controller-oscillator (VCO) 240 for generating a carrier signal at a desired frequency; a power amplifier 242, preferably a differential amplifier, for generating and sending amplified signals; an antenna 241 for transmitting a UWB signal to a receiver(s); and one or more bus lines 260 for electrically connecting the components of the tag to each other.

The power manager 230 may include: a power supply detector 232 for monitoring the voltage level of the power supply 206; and a low-drop-out (LDO) & bandgap regulator 234 (or, shortly, LDO) for sending an output signal at a preset voltage level. It is noted that the UWB transmitter 200 may include other components and/or some of the components may be replaced by other suitable electrical components.

In embodiments, to optimize the power consumption, the tag 202 may remain in a low power mode during its normal operation (i.e., transmitting the UWB signals) and enter a high power mode only when it performs certain tasks, such as downloading the information stored in the OTP 220 to the read/write memory 218 and testing/debugging the tag 202. In embodiments, the OTP 220 contains information, such as chip configuration, tag identification (TID), sleep mode duration, calibration value for the VCO 240, and other parameters for operating the tag 202. The power consumption by the OTP 220 may be higher than that of the read/write memory 218. Thus, in embodiments, to reduce the power consumption, the information stored in the OTP 220 is downloaded into the read/write memory 218, and the tag 202 accesses the read/write memory 218 for the downloaded information.

Figure 3:
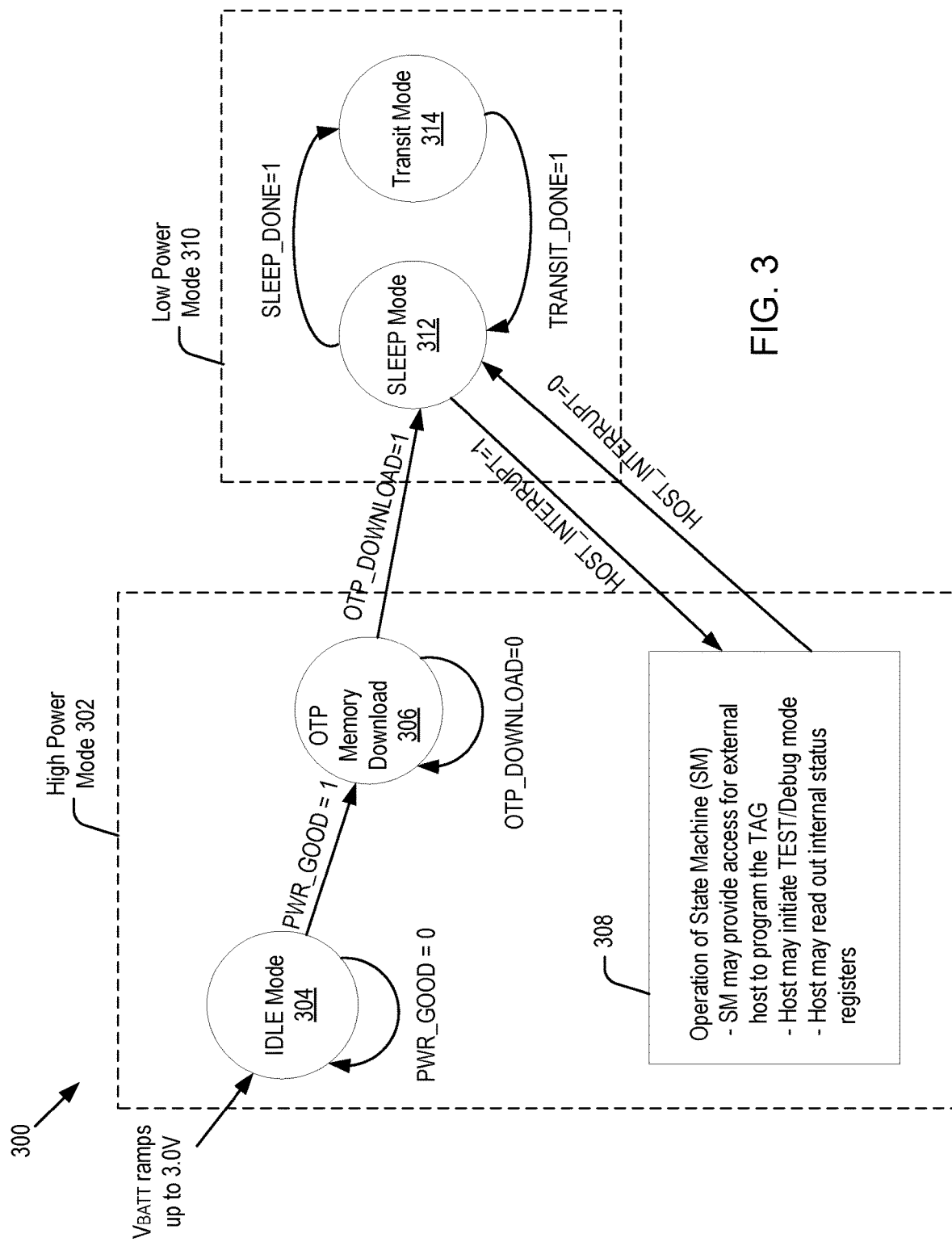
FIG. 3 shows an operational diagram of the UWB transmitter in FIG. 2.
Figure 4:
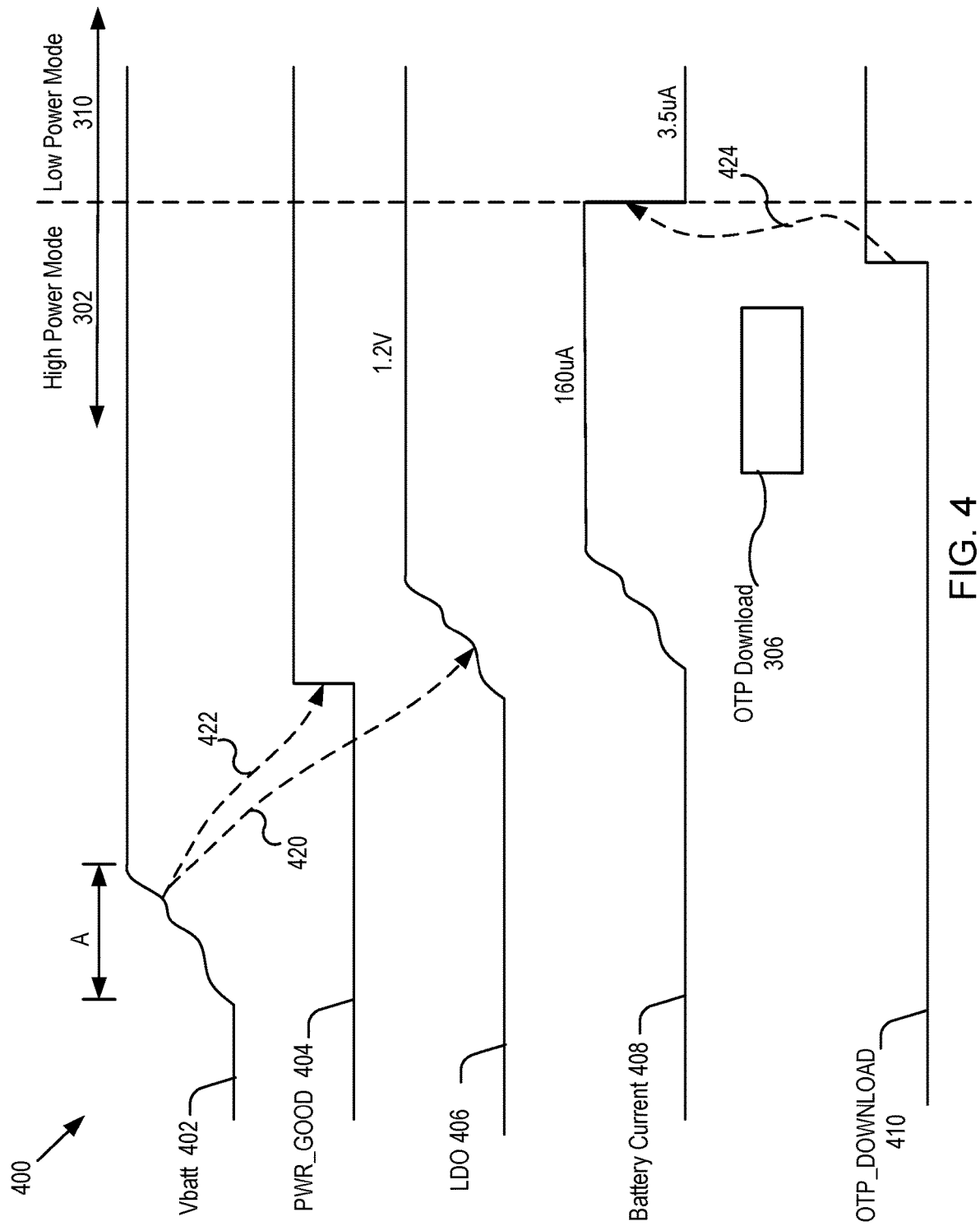
FIG. 4 shows an exemplary internal circuit timing diagram of the UWB transmitter in FIG. 2 according to one embodiment of the present invention.

FIG. 3 shows an operational diagram 300 of the UWB transmitter 200 in FIG. 2. FIG. 4 shows an exemplary internal circuit timing diagram of the UWB transmitter 200 in FIG. 2 according to one embodiment of the present invention. As depicted in FIGS. 3 and 4, the tag 202 goes into the high power mode 302 when the power supply 206 ramps up to a preset voltage level. More specifically, when the power supply 206 is connected to the tag 202 (or the user activates the tag), the VBATT signal 402 reaches its steady state after a transition period, A. It is noted that the VBATT signal 402 at the steady state and the transition period may vary depending on the types of power supply and the components of the tag 202. Then, the tag 202 exits the IDLE mode 304. More specifically, the power supply detector 232, which monitors the voltage level of the power supply 206, changes its output signal, PWR_GOOD 404, from low ("0") to high ("1"). During the high power mode 302, the tag 202 consumes the higher level of electrical current as indicated by the battery current signal 408.

In FIG. 4, the arrows 420, 422 and 424 indicate the flow of signals between components of the tag 202. For instance, the arrow 422 indicates that the power supply detector 232 monitors the output voltage from the power supply 206 and causes the PWR_GOOD signal 404 to go from low to high when the output voltage of the power supply reaches its steady state. Similarly, the arrow 420 indicates that the LDO 234 is activated when the VBATT signal 402 is ramping up, and its output signal 406 goes to a preset level. Also, the battery current 408, which indicates the electrical current flowing into the tag 202, reaches to a preset level, during the high power mode 302.

Referring back to FIG. 3, during the OTP memory download mode 306, the switch 262 is turned on to power the OTP 220 and the information stored in the OTP 220 is downloaded into the read/write memory 218. Also, during the OTP memory download mode 306, the OTP_DOWNLOAD signal 410 is set to low ("0"). Upon completion of the OTP memory download 306, the OTP_DOWNLOAD signal 410 is set to high ("1"). In embodiments, the state machine 212 may control the status of the OTP_DOWNLOAD signal 410. Then, the tag 202 exits the high power mode 302 and enters the low power mode 310. Also, as indicated by the arrow 424 (shown in FIG. 4), the battery current 408 goes to the low level, to minimize the power consumption by the tag 202.

During the low power mode 310, the tag 202 is in the SLEEP mode 312 during a preset time interval, where the value of the preset time interval may be stored in the read/write memory 218. At the end of the SLEEP mode 312, the SLEEP_DONE signal is set to high ("1") and the tag 202 enters the transit mode 314. During the transit mode 314, the tag 202 transmits a UWB signal through the antenna 241. Then, the TRANSIT_DONE signal is set to high ("1") and the tag 202 goes back to the SLEEP mode 312. As such, the time interval during which the tag 202 is in the SLEEP mode 312 may determine the time interval between two consecutive UWB signals transmitted by the UWB transmitter 200. During the SLEEP mode 312, the SLEEP_DONE signal is set to low, while, during the Transit mode 314, the TRANSIT_DONE is set to low. In embodiments, the state machine 212 may change the status of the SLEEP_DONE and TRANSIT_MODE signals.

In embodiments, the tag 202 may enter the high power mode 302 when it is interrupted by the host controller 204. For instance, the host controller 204 may send an interrupt signal via the COM port 252 and the state machine 212 may set the HOST_INTERRUPT signal to high ("1"). Then, as indicated in the box 308, various tasks may be performed during the high power mode 302; the state machine 212 may communicate a signal to the TC access 214 so that the host controller 204 can access and/or program the tag 202; the host controller 204 may initiate a test/debug mode; and the host controller 204 may read out the information stored in the read/write memory 218. It should be apparent to those of ordinary skill in the art that, during the high power mode 302, the tag 202 may perform additional tasks than those listed in the box 308 and the battery current signal 408 is in the high state. Upon completion of one or more tasks in the box 308, the tag 202 enters into the low power mode 310 and the HOST_INTERRUPT signal is set to low ("0").

Figure 5:
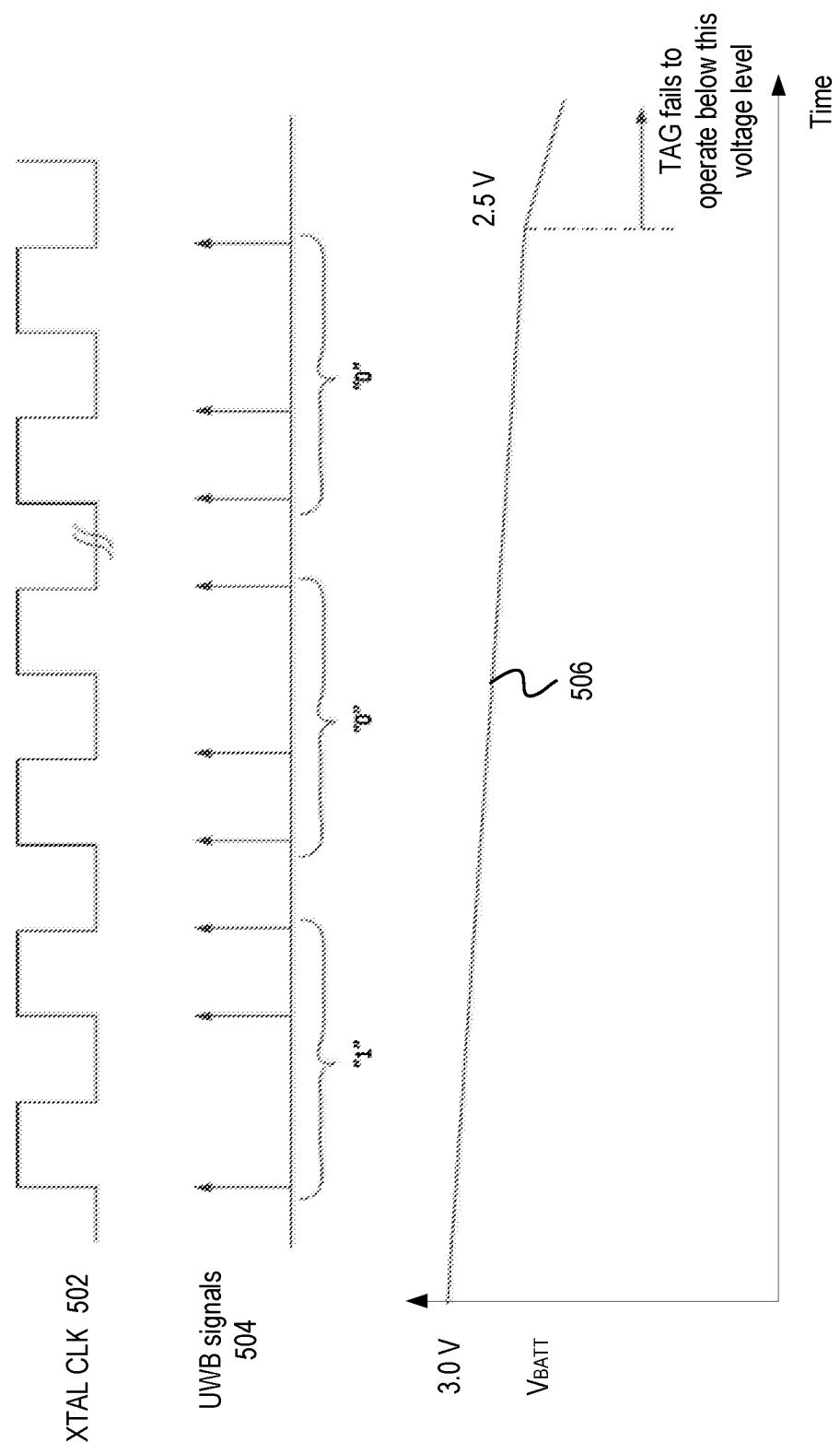
FIG. 5 shows UWB signals transmitted by a UWB transmitter as the power supply of the UWB transmitter degrades over time.

FIG. 5 shows UWB signals 504 transmitted by a UWB transmitter as the power supply of the UWB transmitter degrades over time. As depicted, the UWB transmitter may transmit the UWB signals (or UWB RF transmission) 504 in synchronization with the clock signal, XTAL_CLK, 502 generated by the OSC 210. As the power supply 206 degrades over time and/or with usage, its output voltage 506 may go below a threshold level, causing the tag 202 to fail to operate. The frequency of XTAL_CLK 502 is set to any suitable value.

Figure 6:
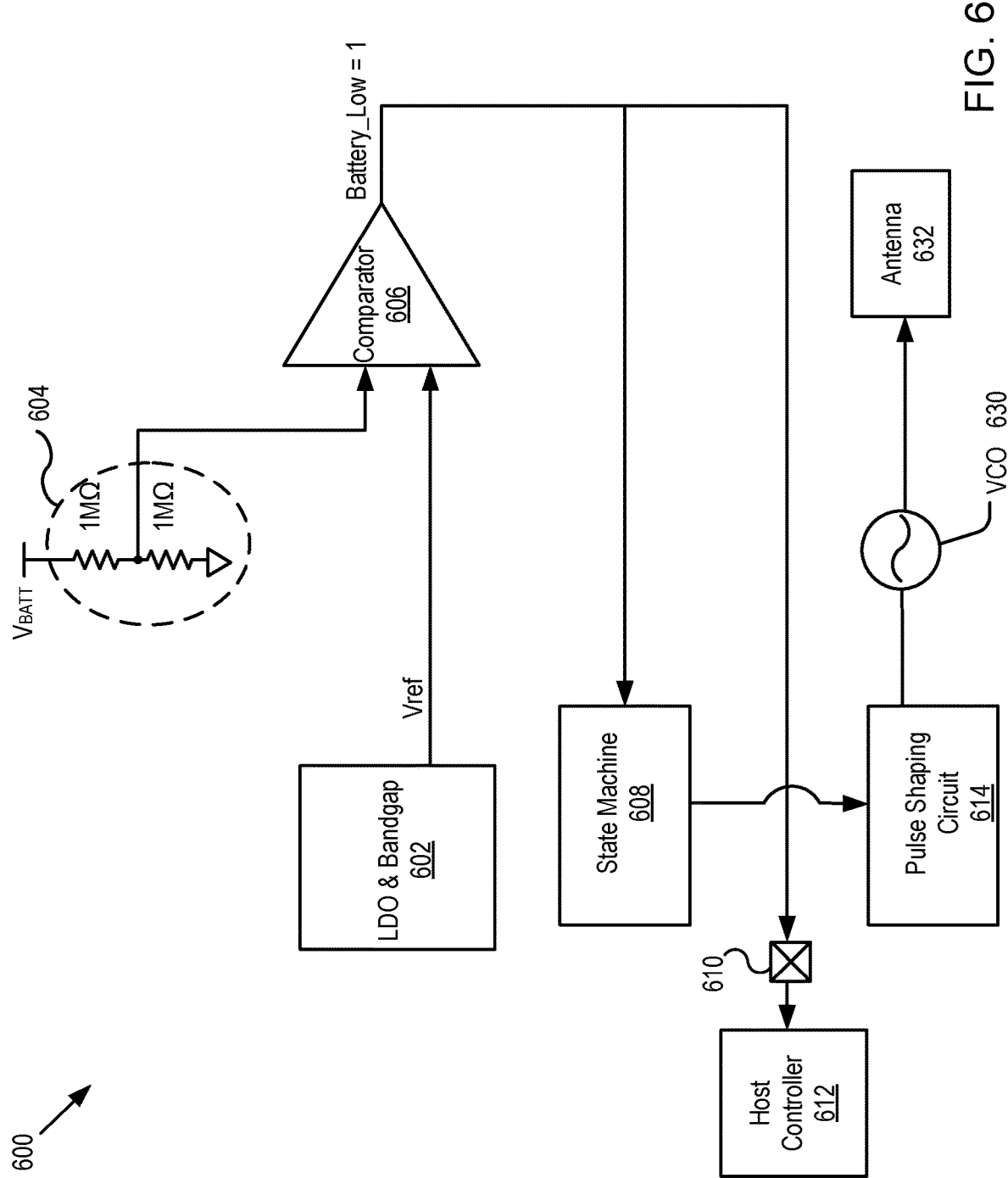
FIG. 6 shows a schematic diagram of a circuit for monitoring degradation of a power supply for a UWB transmitter according to another embodiment of the present invention.

FIG. 6 shows a schematic diagram of a circuit 600 for monitoring degradation of a power supply for a UWB transmitter according to another embodiment of the present invention. As depicted, the circuit 600 includes: a LDO & bandgap regulator (or, shortly LDO) 602 for generating a reference voltage, Vref; a voltage divider 604 for reading the voltage level of the power supply, VBATT; a comparator 606 for comparing the output voltage of the voltage divider 604 to the reference voltage, Vref, and sending a signal, BATTERY_LOW=1, to a state machine 608 when the output voltage of the voltage divider 604 goes below the reference voltage; and a pulse shaping circuit 614 for receiving a signal from the state machine 608 and sending a signal to the VCO 630, which in turn causes the antenna to transmit a warning signal. The LDO 602, state machine 608, pulse shaping circuit 614 and VCO 630 may correspond to the LDO 234, state machine 212, pulse shaping circuit 216 and VCO 240 in FIG. 2, respectively.

In embodiments, the reference voltage Vref may be set to a suitable level. In embodiments, the voltage divider 604 produces its output voltage that is a fraction (such as ½) of VBATT. It is noted that other suitable types of electrical components may be used in place of the voltage divider 604, LDO 602, and comparator 606.

In embodiments, the host controller 612 may take a proper action in response to the signal, BATTERY_LOW=1, received through the port 610. For instance, the host controller 612 may send a warning signal to a user. In embodiments, in response to the signal, BATTERY_LOW=1, the state machine 608 may control the pulse shaping circuit 614, causing the antenna 632 to transmit UWB signals, where the UWB signals indicate that the voltage level of the power supply, VBATT, is below a preset level.

Figure 7:
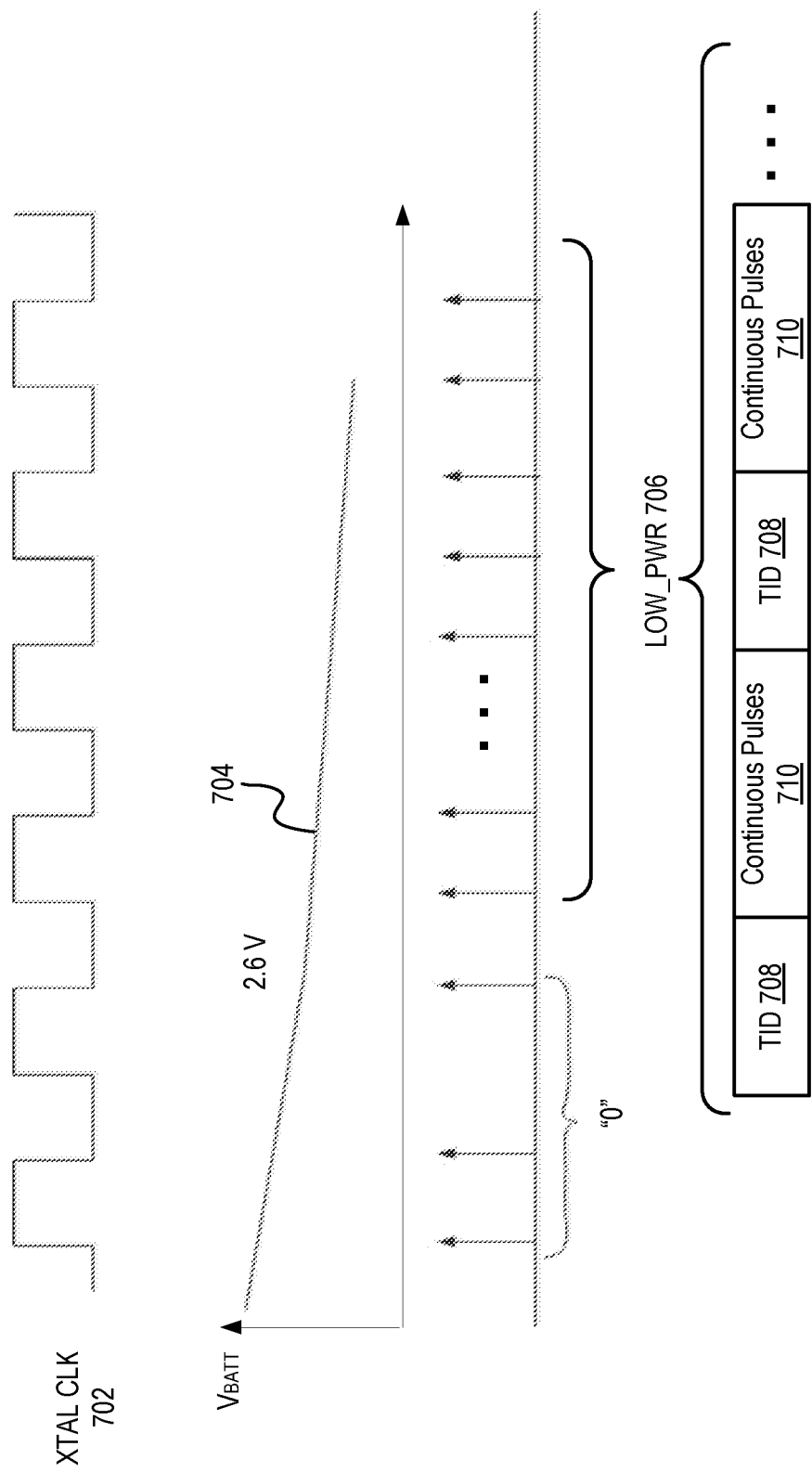
FIG. 7 shows exemplary UWB signals for indicating that the voltage level of a UWB power supply is below a preset level according to another embodiment of the present invention.

FIG. 7 shows exemplary UWB signals for indicating that the voltage level of a UWB power supply is below a preset level according to another embodiment of the present invention. As depicted in FIG. 7, when the voltage level, VBATT, 704 of the power supply goes below a threshold level, the BATTERY_LOW signal is set to high ("1") and the antenna 632 may transmit a train of UWB signals 706 that indicate the low voltage level. In embodiments, the UWB signals (termed as LOW_PWR signal) 706 may include the tag identification (TID) 708 followed by continuous pulses 710, where the TID 708 is used to identify the transmitter. The continuous pulses 710 may be transmitted during a preset time interval at a predetermined frequency of the clock signal, XTAL_CLK, 702. The UWB transmitter may repeat sending the TID 708 and continuous pulses 710 until the transmitter fails to operate or the user responds to the LOW_PWR signal and take a proper action for the degraded power supply. It is noted that other suitable pulses may be used in place of the continuous pulses 710 as long as the receivers 104 can recognize the pulses as a warning signal for indicating that the voltage level of the power supply VBATT is below a preset threshold.

Figure 8:
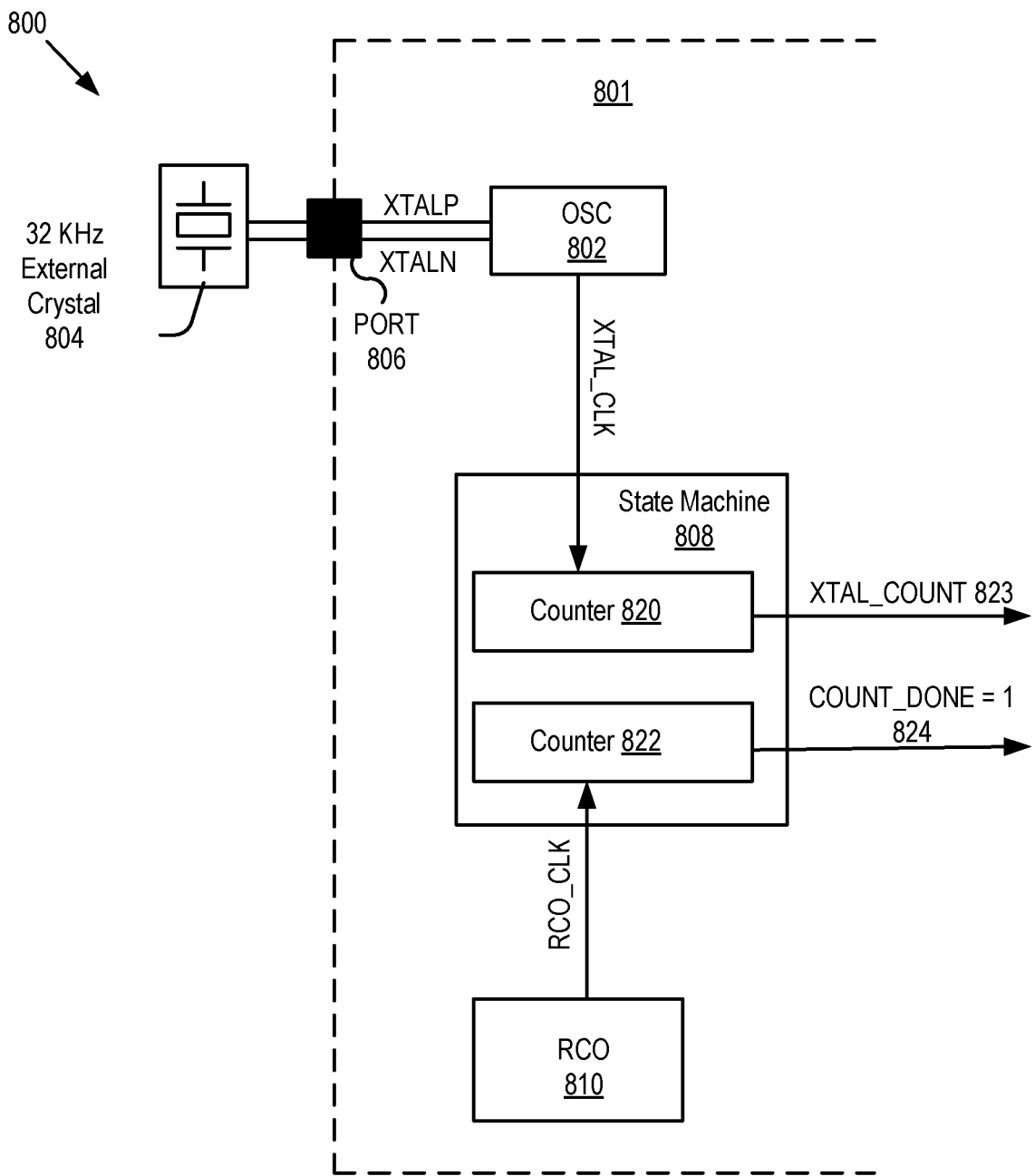
FIG. 8 shows a schematic diagram of a UWB transmitter according to another embodiment of the present invention.

FIG. 8 shows a schematic diagram of a UWB transmitter 800 according to another embodiment of the present invention. As depicted, the external crystal 804 (that is similar to the external crystal 208 in FIG. 2 and operates at a certain frequency) may communicate to the oscillator (OSC) 802 through a port 806 via two signal lines, XTALP and XTALN. In embodiments, to reduce the manufacturing cost of the external crystal 804, a Resistor-Capacitor Oscillator (RCO) circuit 810 may be implemented in the tag 801 and the output clock signal, RCO_CLK, from the RCO 810 may be used in place of the clock signal, XTAL_CLK, from the OSC 802. In some embodiments, a UWB transmitter may have an RCO 810 only. In other embodiments, a UWB transmitter may have both the RCO 810 and the OSC 802 coupled to the external crystal 804. In such a case, the state machine 808 may need to select one of the two clock signals, RCO_CLK and XTAL_CLK.

In embodiments, the state machine 808 includes a first counter 820 and a second counter 822. The first counter 820 is coupled to the oscillator 802 to receive XTAL_CLK from the OSC 802. The second counter 822 is coupled to the RCO 810 and receives RCO_CLK from the RCO 810. Based on the timing diagram in FIG. 9, the state machine 808 may choose one of the two clock signals; XTAL_CLK and RCO_CLK.

FIG. 9 shows an exemplary internal circuit timing diagram 900 of the UWB transmitter 800 according to another embodiment of the present invention. As depicted, the voltage level of the power supply, VBATT, 902 reaches its steady state after a transition period. Then, as indicated by an arrow 912, the power supply detector (such as 232) is triggered by the VBATT 902 and causes its output signal, PWR_GOOD 904, goes from low to high. Then, the transition of the PWR_GOOD 904 causes the RCO_EN signal 906 and XTAL_EN signal 909 to go to high as indicated by two arrows 914 and 918 so that the RCO 810 and the external crystal 804/OSC 802 are enabled.

Upon transition of the RCO_EN signal 906 from low to high, the counter 822 starts counting pulses in the RCO_CLK signal 908 during a time interval A. At the end of the time interval A, the counter 822 may change the COUNT_DONE signal 824 from low ("0") to high ("1'). Similarly, upon transition of the XTAL_EN signal 909 from low to high, the counter 820 starts counting the pulses in the XTAL_CLK signal 910 until the COUNT_DONE=1 signal 824 is received and outputs the counted number XTAL_COUNT 823. As shown in the diagram 900, there may be a time delay, B, between the starting pulses of the RCO_CLK signal 908 and XTAL_CLK signal 910, where the delay B may depends on the characteristics of the components of the UWB transmitter 800.

If XTAL_COUNT is greater than a first threshold value, say 20, the state machine 808 may decide that the external crystal 804 is connected to the tag 801 and select XTAL_CLK as the system clock signal. However, if XTAL_COUNT is less than a second threshold, say 5, the state machine 808 may decide that there is no external clock coupled to the tag 801 and use RCO_CLK as the system clock signal.

One skilled in the art will also recognize that various embodiments may be implemented for ultra-broad-band (UWB) transmitter tag. The foregoing description of the invention has been described for purposes of clarity and understanding. It is not intended to limit the invention to the precise form disclosed. Various modifications may be possible within the scope and equivalence of the appended claims.

The invention claimed is:

1. An ultra-wide-band (UWB) transmitter tag comprising:
   a power management circuit coupled to a power supply for power consumption management of the UWB transmitter tag, the tag goes into a high power mode after the power supply ramps up to a preset voltage level;
   a memory coupled to the power management circuit via a switch, the memory is switched on in the high power mode to download information stored in the memory into a read and write memory; and
   a state machine coupled to the power management circuit, the state machine changes a status of a memory download signal after completion of the information download from the memory to enable the UWB transmitter tag into a low power mode.

2. The UWB transmitter tag of claim 1 wherein the memory is a one-time-programmable memory (OTP).

3. The UWB transmitter tag of claim 1 wherein the memory download signal is set to low during the information download and set to high after completion of the information download.

4. The UWB transmitter tag of claim 1 wherein in the low power mode, the UWB transmitter tag is in a sleep mode during a preset time interval and enters a transit mode to transmit a UWB signal at the end of the preset time interval.

5. The UWB transmitter tag of claim 4 wherein the UWB transmitter tag goes back to the sleep mode from the transit mode after the UWB signal is transmitted.

6. The UWB transmitter tag of claim 1 further comprises a test and calibration access (TC access) coupled to the state machine, the TC access communicates to an outside host controller via a test port on the UWB transmitter tag.

7. The UWB transmitter tag of claim 6 wherein the UWB transmitter tag enters the high power mode when the state machine sets a host interrupt signal to high after the host controller sends an interrupt signal.

8. The UWB transmitter tag of claim 7 wherein the UWB transmitter tag enters the low power mode when the state machine sets the host interrupt signal to low after completion of one or more host controller initiated tasks.

* * * * *